US012754771B2

(12) United States Patent
Nandan et al.

(10) Patent No.: US 12,754,771 B2
(45) Date of Patent: Oct. 6, 2026

(54) BANDWIDTH CONTROLLED DATA SYNCHRONIZATION FOR IMAGE AND VISION PROCESSOR

(71) Applicant: Texas Instruments Incorporated, Dallas, TX (US)

(72) Inventors: Niraj Nandan, Plano, TX (US); Hetul Sanghvi, Richardson, TX (US); Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 616 days.

(21) Appl. No.: 18/302,945

(22) Filed: Apr. 19, 2023

(65) Prior Publication Data

US 2023/0259402 A1 Aug. 17, 2023

Related U.S. Application Data

(62) Division of application No. 17/012,223, filed on Sep. 4, 2020, now Pat. No. 11,669,370, which is a division (Continued)

(51) Int. Cl.
*G06F 9/46* (2006.01)
*G06F 9/48* (2006.01)

(Continued)

(52) U.S. Cl.
CPC .......... *G06F 9/5044* (2013.01); *G06F 9/4887* (2013.01); *G06F 9/52* (2013.01); *G06F 11/0757* (2013.01)

(58) Field of Classification Search
CPC ........ G06F 9/5044; G06F 9/4887; G06F 9/52; G06F 11/0757
See application file for complete search history.

(56) References Cited

U.S. PATENT DOCUMENTS 3,623,007 A 11/1971 Eckhart
10,755,380 B2 8/2020 Mody et al.

(Continued)

OTHER PUBLICATIONS

Roman Stasszewski and Hannes Estl, "Making Cars Safer Through Technology Innovation", Texas Instruments, Inc., White Paper, Oct. 2013, pp. 1-8.

(Continued)

*Primary Examiner* — Gregory A Kessler
(74) *Attorney, Agent, or Firm* — Michael T. Gabrik; Charles F. Koch

(57) ABSTRACT

Systems include data processors to process a set of image data in parallel, and thread schedulers coupled to the data processors. Each of the thread schedulers provides a respective task start signal for a respective data processor. Such systems also include a bandwidth controller coupled to one or more data processors. The bandwidth controller is configured to, for each of the data processor(s): maintain a respective token count, and determine whether to stall or propagate the respective task start signal from the respective thread scheduler to the data processor based on the respective token count. Other aspects include pattern adaptors respectively provided in the schedulers to allow mixing of multiple data patterns across blocks of data, transaction aggregators that allow re-using the same image data by multiple threads of execution while the image data remains in a given data buffer, and timers to detect failure and hang events.

18 Claims, 9 Drawing Sheets

Related U.S. Application Data of application No. 15/269,952, filed on Sep. 19, 2016, now Pat. No. 10,776,167.

(51) Int. Cl.

| | |
|---|---|
| ***G06F 9/50*** | (2006.01) |
| ***G06F 9/52*** | (2006.01) |
| ***G06F 11/07*** | (2006.01) |

(56) References Cited

U.S. PATENT DOCUMENTS

| | | | |
|---|---|---|---|
| 2003/0131041 A1 | 7/2003 | Dinker et al. | |
| 2005/0024927 A1* | 2/2005 | Dolwin | G06F 1/3203 365/154 |
| 2008/0263379 A1 | 10/2008 | Tuuk et al. | |
| 2012/0230341 A1 | 9/2012 | Mital et al. | |
| 2014/0082434 A1 | 3/2014 | Knight et al. | |

OTHER PUBLICATIONS

Hannes Estl, "Paving the Way to Self-Driving Cars with Advanced Driver Assistance Systems", Texas Instruments, Inc., Aug. 2015, pp. 1-9.

Nimar S. Arora, Robert D. Blumofe, and C. Greg Plaxton, "Thread Scheduling for Multiprogrammed Multiprocessors", Proceedings of the Tenth Annual ACM Symposium on Parallel Algorithms and Architectures (SPAA), Puerto Vallarta, Mexico, Jun. 1998, pp. 1-11.

Mihir Narendra Mody, "Down Scaling Images in a Computer Vision System", U.S. Appl. No. 15/143,491, filed Apr. 29, 2016, pp. 1-29.

* cited by examiner

BANDWIDTH CONTROLLED DATA SYNCHRONIZATION FOR IMAGE AND VISION PROCESSOR

CROSS-REFERENCE TO RELATED APPLICATIONS

This application is a divisional of U.S. application Ser. No. 17/012,223, filed Sep. 4, 2020, which is a divisional of U.S. application Ser. No. 15/269,952, filed Sep. 19, 2016 (now U.S. Pat. No. 10,776,167), each of which is incorporated by reference herein in its entirety.

FIELD OF THE DISCLOSURE

Embodiments of the present disclosure generally relate to computer vision systems, and more specifically relate to data synchronization for image and vision processing blocks.

BACKGROUND OF THE DISCLOSURE

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems rely on computer vision processing to detect objects in the field of view of one or more cameras. See, for example, "Making Cars Safer Through Technology Innovation," October 2013.

Multi-resolution decomposition of an image, i.e., down scaling of an image in differing resolutions, to generate a pyramid of images of differing resolutions is a fundamental operation in computer vision applications. The image pyramid enables analysis of the scene captured in the original image at different "sizes", e.g., over different distances.

Decomposition of each camera image may be performed using various processing engines that execute tasks in an iterative manner, where each iteration of the task may be referred to as a portion of a "thread." From the software perspective, the software is often executed as one or more threads. A thread may correspond to a sequence of tasks that are executed by a processor core. Various thread scheduling techniques are known, see, for example: Nimar Arara, et. al., "Thread Scheduling for Multiprogrammed Multiprocessors," June 1998.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
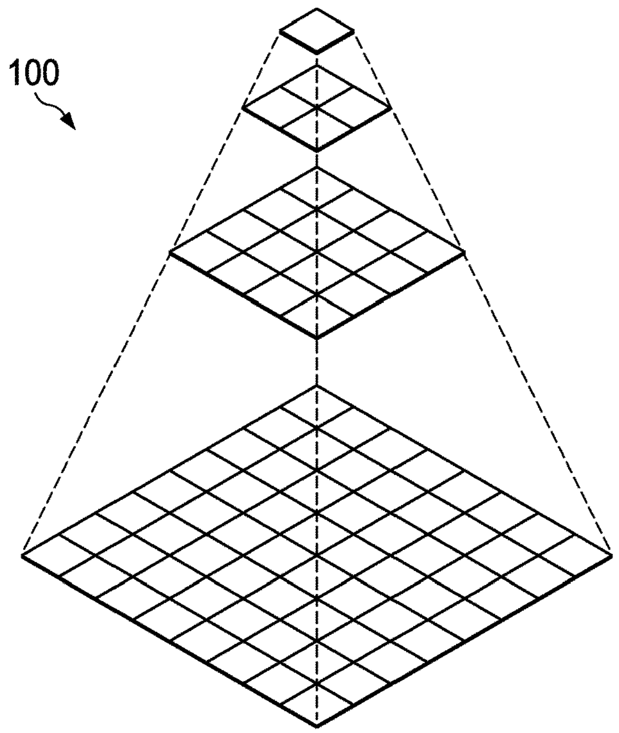
FIG. 1 is an example of an image pyramid.

Specific embodiments of the disclosure will now be described in detail with reference to the accompanying figures. Like elements in the various figures are denoted by like reference numerals for consistency.

Various techniques will be disclosed herein to assist with the process of scheduling access to various blocks of image data for processing of the image data. For example, a scheme that allows mixing of multiple data patterns across blocks of data by using pattern adaptors in the scheduler will be disclosed herein. A scheme that allows re-using the same image data while the image data remains in a given data buffer by using a transaction aggregator will be disclosed herein. A scheme that provides bandwidth control for critical and less critical tasks by using programmable delays will be disclosed herein. A scheme that provides hang detection in case of failure in processing blocks using watch dog timers inside the scheduler will also be disclosed herein.

As previously mentioned, the computer vision processing performed in camera-based embedded safety systems may require the generation of image pyramids, i.e., a hierarchy of down-sampled images of decreasing resolution generated from high resolution input. An image pyramid or pyramids may be generated for an image based on the particular vision algorithm(s) used. For example, the image pyramid may be a set of images in which each image is down-sampled by a factor of two both horizontally and vertically with respect to the image of the next higher resolution in the pyramid. In such a pyramid, each image is referred to as an octave. FIG. 1 is an example of such a pyramid.

For some algorithms, down-sampled images are also generated between each octave of the pyramid. The scale ratios used to generate the down-sampled images between octaves, i.e., the intra-octave scaled images, may be arbitrary. For example, for pedestrian detection and object detection in an automotive safety system, the ratios used for the between octave scaling may be between 1 and 2, e.g., 1.1, $1.1^2$, etc., and the number of scaled images between each octave may be eight. Assuming an image pyramid of six octaves, 5*8=40 scaled outputs are generated for a single input image.

A common software approach to image scaling is included in OpenCV (Open Source Computer Vision library). OpenCV is a widely used open source computer vision and machine learning software library that includes support for real-time computer vision processing. In OpenCV, the generation of a pyramid such as that of FIG. 1 includes, for each image layer, convolving the previous layer with a Gaussian kernel and removing each even-number row and column from the result. Each image layer (octave) is generated sequentially by calling a single down-sampling function with the previous higher resolution layer as input. In addition, in OpenCV, generic scaling of images such as that need for generation of the intra-octave scaled images is performed by sequentially calling a single resizing function. The down sampling for the generic scaling may use bilinear, bicubic, spline, or Lancoz filtering.

A hardware approach may be used to support the required image scaling in which a number of independent image re-sizers or scalers are implemented that may operate with a single input thread in some embodiments or on multiple input threads in other embodiments. The number of hardware scalers included in a system may vary and may be chosen based on factors such as throughput requirements and cost. Each of the scalers may have the same input and may be independently programmed to generate downscaled outputs at different resolutions. Alternatively, the scalers may be operated in sequence, i.e., in a cascade, such that the downscaled output of a scaler is the input of the next scaler in the sequence. In either case, multiple passes through the scalers may be used if the number of scalers is less than the number of desired scaled images.

Each scaler may perform horizontal scaling on some number of consecutive rows of an image and store the results in line buffers. The number of consecutive rows processed and the number of line buffers depends on the number of taps of the filter used for vertical scaling. Vertical scaling is then performed on the contents of the line buffers. The horizontal and vertical scaling is repeated until all rows of an input image have been processed.

Figure 2:
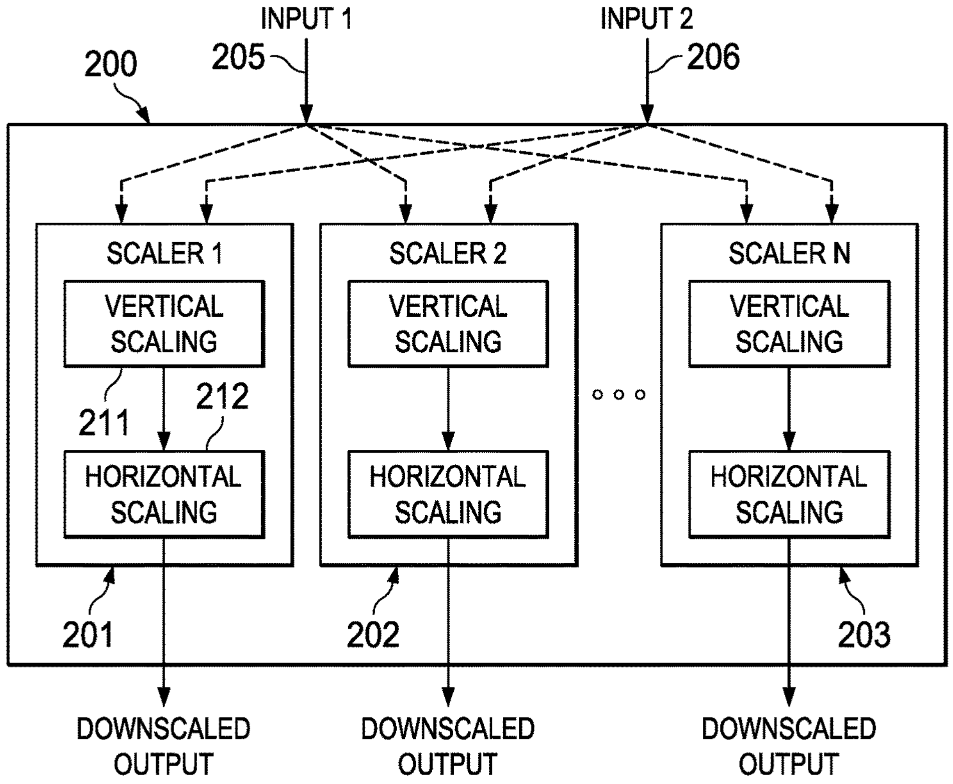
FIG. 2 is a block diagram of an example multi-thread image scaler with multiple scalers.

In some embodiments, multi-thread image scaling may be performed using multiple scalers that may be shared among the multiple threads. More specifically, all of the scalers may be used by one thread or the scalers may be partitioned among two or more of the input threads. In addition, in some embodiments, each scaler performs the vertical scaling before the horizontal scaling, eliminating the need for line buffers in each scaler. Further, in some embodiments, unified polyphase filtering is provided in which the filter taps for a phase can be tuned for octave scaling at an integer ratio as well as generic scaling at arbitrary fractions. That is, any kind of interpolation may be simulated, e.g., Gaussian, bilinear, bicubic, Lancoz, etc. Also, in some embodiments, dual precision modes, e.g., 1/64 and 1/32, are provided for the down scaling ratio to handle the typical case of identical horizontal and vertical ratios with no change in aspect ratio and scaling with change in aspect ratio FIG. 2 is an example illustrating an embodiment of a multi-thread image scaler 200 with multiple scalers 201-203. In this example, the number of input threads 205, 206 is assumed to be two. One of ordinary skill in the art will understand embodiments in which there are more input threads. The set of N scalers is shared between the two input threads. For any given processing cycle, all N scalers may be assigned to one of the input threads or each input thread may be assigned a subset of the scalers. For example, the Input 1 thread may be processed in multiple scalers such as 201, 202 and the Input 2 thread may be processed in scaler N. Further, each of the N scalers may perform vertical scaling 211 before horizontal scaling 212.

A more detailed description of image down scaling is provided in U.S. patent application Ser. No. 15/143,491, "Down Scaling Images in a Computer Vision System," filed 29 Apr. 2016, which is incorporated by reference herein.

While scaling has been discussed above, other types of processing blocks may also be provided for various image, video, or vision processing functions, such as image processing, lens distortion correction, noise filter, vision preprocessing functions, motion detection, edge detection, etc. The various blocks may be cascaded or chained to perform necessary functionality. Blocks may be pipelined for buffer data sets. Data or buffers and control signals or messages may be centralized or distributed using known or later developed techniques.

Figure 3:
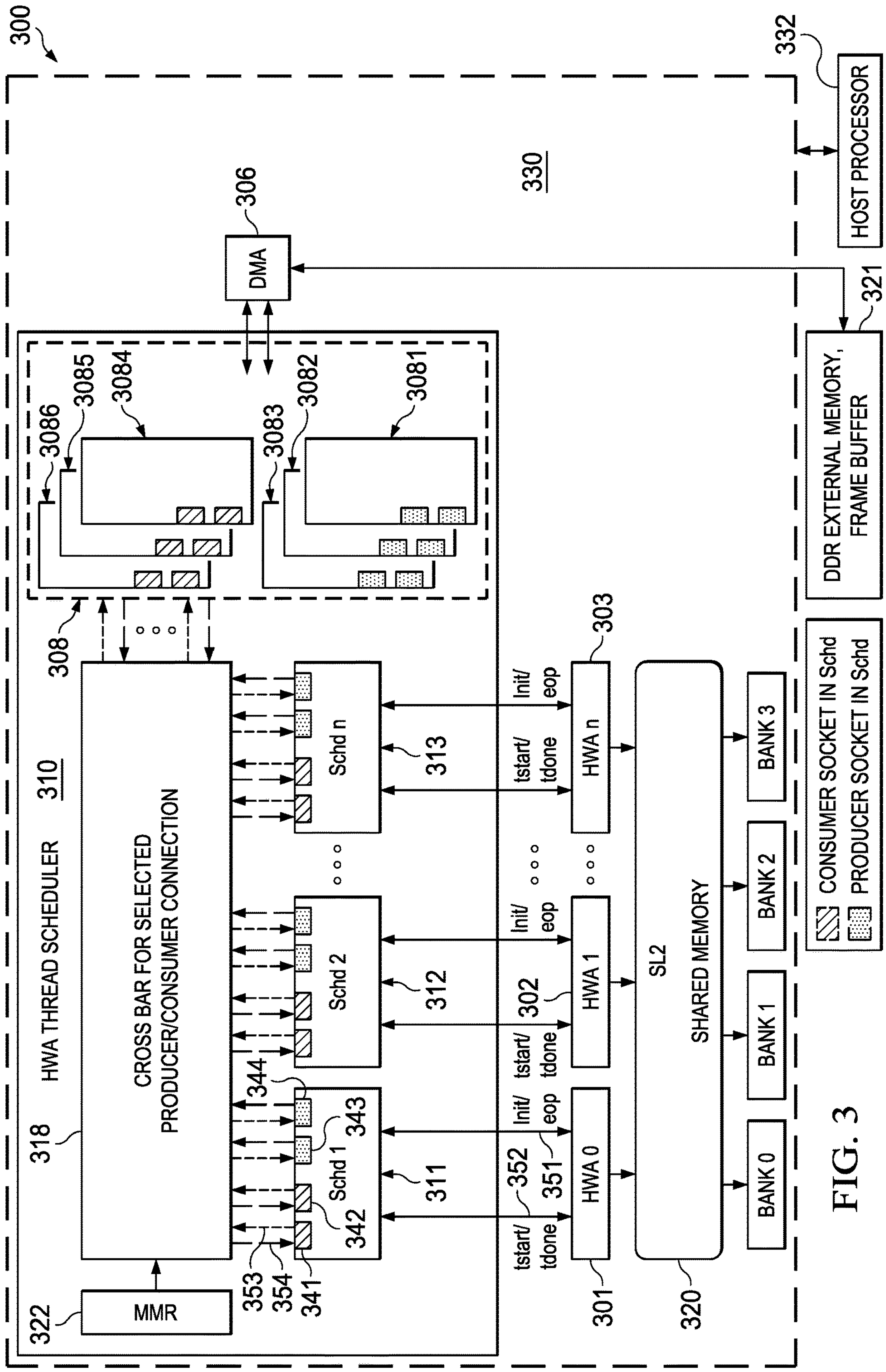
FIG. 3 is a block diagram of an example system that includes multiple hardware accelerator modules and a hardware accelerator thread scheduler.

FIG. 3 is a block diagram of an example system 300 that includes multiple hardware accelerator modules 301-303 and a hardware accelerator thread scheduler (HTS) 310. While three modules 301-303 are illustrated here for simplicity, various embodiments may include fewer or more than three hardware accelerator modules. Although accelerator modules 301-303 has been illustrated as hardware accelerator modules, in another embodiment accelerator modules may be completely hardwired, programmable cores, or combination of hardware and firmware/software, for example. Each of the hardware accelerator modules 301-303 may have access to shared memory 320 in which various blocks of storage area may be designated as buffers for blocks of data that are being processed by the hardware and/or software processing modules.

Shared memory 320 is referred to as "level 2" (L2) memory and may be implemented within a single integrated circuit that includes the various processing modules 301-303 and HTS 310 as a "system on a chip" SoC 330. A larger external memory 321 may be coupled to SoC 330 to provide storage room for one or more frames of image data, etc. External memory 321 may be implemented as double data rate (DDR) synchronous dynamic random-access memory (SDRAM), for example. Various other known or later developed types of bulk memory may be used in place of DDR memory in various embodiments, such as DDR3, DDR4, etc. Component 321 may also be implemented using on chip RAM (part of SOC 330) which is referred as L3. External memory 321 in this disclosure may be referred to as "level 3" (L3) memory or DDR memory Direct memory access (DMA) engine 306 and DMA schedulers 308 may be programmed to move blocks of data between L2 memory 320 and external memory 321 using known or later developed DMA operations.

HTS 310 may include a set of scheduler modules 311-313, one for each of the hardware accelerators 301-303. HTS 310 may also include a set of producer DMA schedulers such as 3081-3083 to load block of data from external memory 321 into SL2 320. HTS 310 may also include set of consumer DMA schedulers such as 3084-3086 to store blocks of data from SL2 320 into external memory 321. The HTS module is a simple messaging layer for low-overhead synchronization of the parallel computing tasks and DMA transfers and may be configured by a host processor 332. Host processor 332 may be located within SoC 330 in some embodiments, or may be located in a separate IC in other embodiments. Memory mapped registers (MMR) 322 may be initialized with various control parameters by host processor 332 to control the operation of HTS 310.

HTS 310 allows autonomous frame level processing for the accelerator sub-system. HTS 310 defines various aspects of synchronization and data sharing between accelerators 301-303. By looking at the producer and consumer dependencies, HTS may ensure that a task starts only when input data and adequate space to write out data is available. In addition to this, HTS 310 may also take care of pipe-up, debug, and abort for HWAs 301-303. HTS 310 may also help in controlling power consumption by generating active clock windows for hardware accelerator clocks when no task is scheduled, for example.

As will be explained in more detail below, each scheduler module 311-313 may include one or more consumer sockets

341-342 and/or one or more producer sockets 343-344. In the following descriptions, various descriptive terms listed in Table 1 will be used.

TABLE 1

| Terminology | |
|---|---|
| Node | an accelerator or channelized DMA |
| Task | a certain function that runs on a node |
| Pipeline/Thread | A sequence of tasks which have consumer/producer dependencies |
| Producer Message | Producer node generates "pend" (pending) signal indicating availability of consumable data |
| Consumer Message | Consumer node generates "dec" (decrement) signal indicating consumption completion of produced data |
| Socket | Each consumer/producer dependencies are associated with consumer socket and producer socket. A node having consumer socket is called a consumer node. A node having producer socket is called a producer node. |

Each scheduler module 311-313 may be coupled to its respective HWA 301-303 via various signals, such as: an "end of pipeline" and "init" signals 351, a "task start" and "task done" signals 352, etc. An example set of interface signals for interfacing between HTS 310 and HWAs 301-303 is defined in Table 2. The signals defined in Table 2 are an example for the embodiment of FIG. 3; in another embodiment, the operation of the interface signals may be configured to operate in a different manner than illustrated in Table 2.

TABLE 2

HTS interface with HWA

| Signal Name | Dir | Default Val | Type | Description |
|---|---|---|---|---|
| init | out | 1'b0 | Pulse | On init pulse, each accelerator needs to reinitialize internal state/count/interface. |
| init_done | in | 1'b0 | Pulse | Acknowledgement of init activity. Ensure init_done is not looped back (minimum single cycle gap) |
| tstart | out | 1'b0 | Pulse | Task start |
| tdone | in | 1'b0 | Pulse | Task done, acknowledgement of completion of data processing for single task |
| tdone_mask[n-1:0] | in | 0 | In-band with Tdone | For each Tdone, mask indicates validity of output data. When '0' indicates corresponding output buffer is not generated for this Tdone. When '1' indicates valid output buffer is generated. Corresponding producer socket count is incremented. |
| eop | in | 1'b0 | In-band with Tdone | Each hwa needs to indicate completion of frame with eop alongwith Tdone. Hwa will receive init sequence before starting next Tstart. |

There are multiple DMA channel schedulers to control DMA channels, producer DMA schedulers 3081-3083 and consumer DMA schedulers 3084-3086. These DMA schedulers are attached to DMA channels and trigger data transfer. They are connected through channel_start (same timing property as tstart) and channel_done (same timing property as tdone). Each scheduler module 311-313 and 3081-3083 may be configured to generate one or more pend signals depending on its producer socket configuration, such as indicated at 354. Each scheduler module 311-313 and 3081-3083 is generating pend signal through its producer socket. For each producer socket, it may be configured to receive dec signals from its connected consumer, such as indicated at 353. Similarly, each scheduler module 311-313 and 3084-3086 may be configured to receive one or more pend signals on its consumer sockets, such as indicated at 354. For each consumer socket, it may be configured to generate dec signals from its connected consumer, such as indicated at 353. The pend and dec signals from all of the schedulers may be connected to a crossbar switch 318 that may be controlled by a set of memory mapped registers 322. Crossbar switch 318 may be implemented as a full crossbar for maximum flexibility in some embodiments, while in other embodiments it may be implemented as a partial crossbar when maximum flexibility is not needed.

Figure 4:
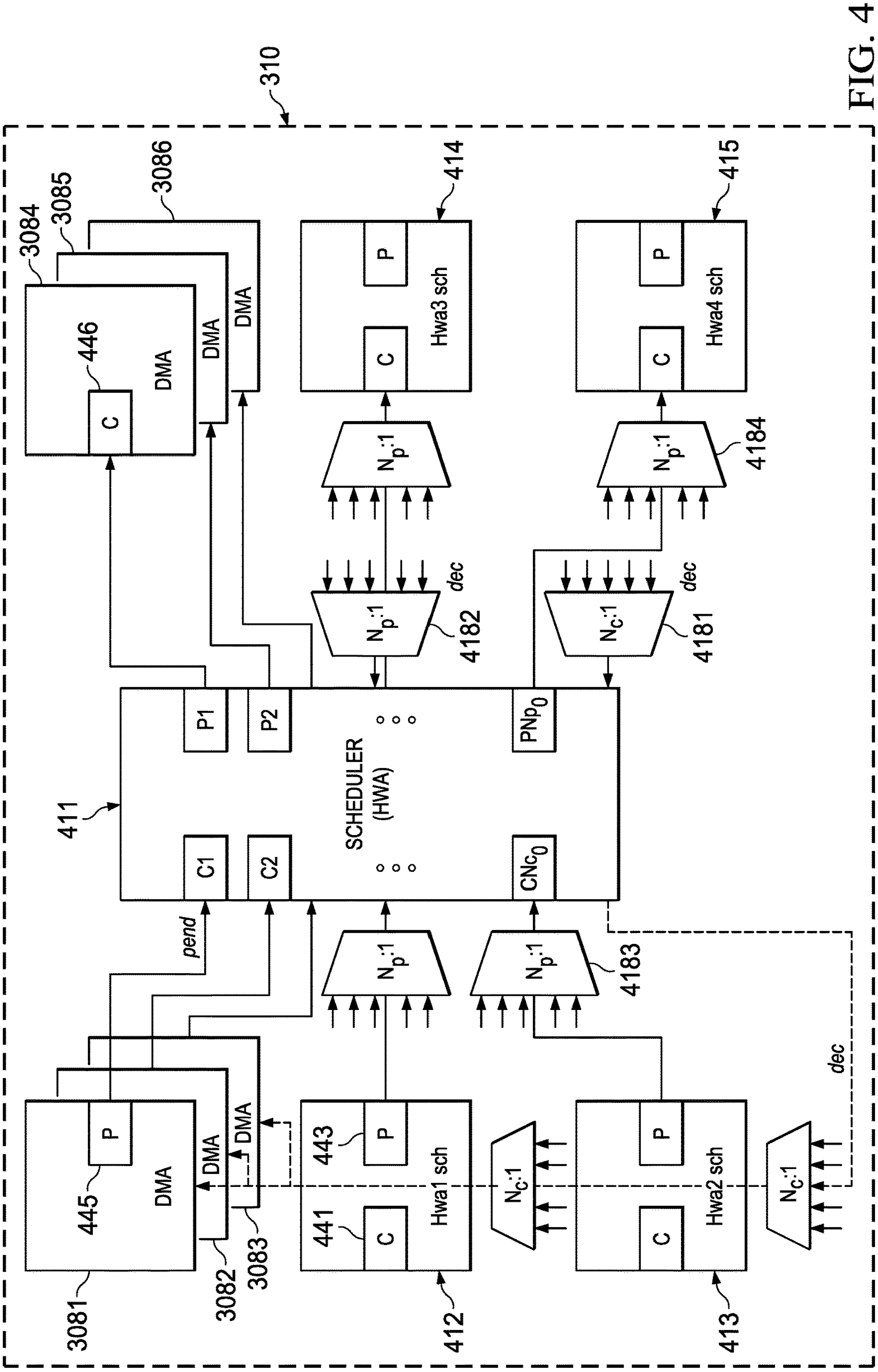
FIG. 4 is a more detailed schematic illustrating a connection diagram for scheduling signals for the system of FIG. 3.

FIG. 4 is a more detailed schematic illustrating a portion of a connection diagram for scheduling signals for HTS 310 of FIG. 3. In this example, each scheduler 411-415 includes a consumer port C, such as indicated at 441, and a producer port P, such as illustrated at 443. Similarly, each DMA producer scheduler 3081-3083 may have one or more producer ports P such as indicated at 445 and each DMA consumer scheduler 3084-3086 may have one or more consumer ports C such as indicated at 446 The functionality of crossbar switch 318, referring back to FIG. 3, is illustrated by various multiplexors such as 4181, 4182 that may be configured by MMR 322, referring back to FIG. 3, to select any one of several dec signals for routing to a particular producer port and by various multiplexors such as 4183, 4184 that may be configured by MMR 322 to select any one of several pend signals for routing to a particular consumer port.

Several guiding principles may be used in an embodiment of the HTS disclosed herein. The concept of distributed synchronization is followed, in which a node is able to activate its successor. DMA nodes may be tightly coupled to hardware accelerators in either producer or consumer mode; in some cases, a DMA node may be connected to a spare scheduler.

In general, a node will handle only one task. When an accelerator implements multiple tasks those tasks may be handled independently from each other. From a thread management view point, these are two different nodes. A node may be programmed to start a task on any other node. A set of probable connections may be predefined; therefore crossbar 418 may not need to be a full crossbar. Flexibility may be provided to allow data to be mapped to different pipelines. Alternatively, flexibility may be provided to map a pipeline where multiple tasks may run in parallel on the same data. Divergence and/or Convergence may be supported in various embodiments.

A task may have multiple "Producer" Nodes; similarly, a task may have multiple "Consumer" Nodes. A producer should not overflow and a consumer should not underflow.

The basic operation of the synchronization scheme is as follows. A task may be activated remotely, such as by host processor 332, referring back to FIG. 3. A task should always indicate end-of-task; indications may be sent to relevant nodes to notify task completion and may thereby be used for next task initiation. Inter-node communication is performed using crossbar 318. Software may directly set up each node scheduler such as 411-415 using configuration registers in MMR 322, referring back to FIG. 3.

Single or multiple conditions may need to be met for a task to be triggered. Notifications to activate a task may only occur after all data for that task is ready to be used in the L2 shared memory 320, referring back to FIG. 3. It is the responsibility of the predecessor node to assure that data is ready. A task may be activated at the completion of related tasks by the predecessor node(s).

Operation of HTS 310 may be re-initialization at the frame or slice level, depending on the type of image data that is being processed. The conditions to activate a task remain static during an operation. In another embodiments, if conditions need to change within an operation, all such changed configurations need to be captured a priori in configuration MMR or changes may be done dynamically through HOST 332, for example.

As will be described below on more detail, several pend events may be accumulated at a source node prior to indicating an accumulated pend event to a hwa node for task scheduling. A consumer node acknowledges consumption of data via a dec event at the end of a task; a producer may use each dec event to decrement its produced data count, for example.

Synchronization Scheme

The general operation of the synchronization scheme will now be described. A maximum buffer size in L2 shared memory 320, referring back to FIG. 3, may be assigned to various producer sockets. Except for the head of a processing pipe, each node will receive consumable data from its predecessor and produce data to be consumed by a consumer downstream in the pipe. A head of pipe DMA producer node fetches data from external memory 321, referring back to FIG. 3, and passes the data on to a consumer. When a buffer is available for all producer sockets of a task scheduler, a task of the accelerator/dma can start depending on consumer socket status, if enabled.

Each accelerator 301-303, referring back to FIG. 3, will wait for all enabled consumer sockets to receive pend from its predecessor producer nodes to start its own processing task.

In a multi-consumer scenario, every producer that produces the data for several consumers would send one pend signal for each consumer. Each task scheduler includes all resources (multiple producer sockets) to emulate a single producer to multi-consumer scenario. Although produced data is same, it may be managed as if multiple data is produced.

Similarly, in a multi-producer scenario, every consumer that consumes data from several producers would send back one dec message for each producer.

For flow control, a scheme is provided to ensure that a producer does not overwrite the data that is not consumed and consumer does not read an empty buffer. Each consumer node, uses a pending signal from connected producer node, which resembles data availability in queue. The pending signal indicates some data entries have been produced to be consumed, but it does not indicate count. HWA operation is stalled if the pending signal is inactive at enabled consumer socket. A pend signal is held active until the referenced data is fully consumed by consumer. A consumer sends dec signal once it has consumed its predecessor produced data. A producer is aware of buffer max depth; it keeps track of the buffer for each consumer.

On each producer node, a count maintained by a scheduler is incremented in response to assertion of a task done signal. The count is decremented after a dec signal from a consumer. HWA operation is stalled if count equals the max depth.

Every HWA would typically play both the consumer and producer roles. In such case every HWA would have both of these flow control logics. HWA operation would start if, and only if, both the consumers as well as the producer socket conditions are met. In other words, HWA operation would be stalled if either input buffers are empty or output buffers are full. In this description of operations, the terms "sockets" and "nodes" have been used interchangeably to explain operations.

For reducing full crossbar complexity, all producer sockets may not need to be connected to all consumer sockets, and vice versa. DMA producer and consumer nodes may be directly connected to its connected accelerator nodes to reduce crossbar complexity. Within accelerator nodes, selected set of producer and consumer is fully crossed giving full flexibility for potential future connections.

Figure 5A:
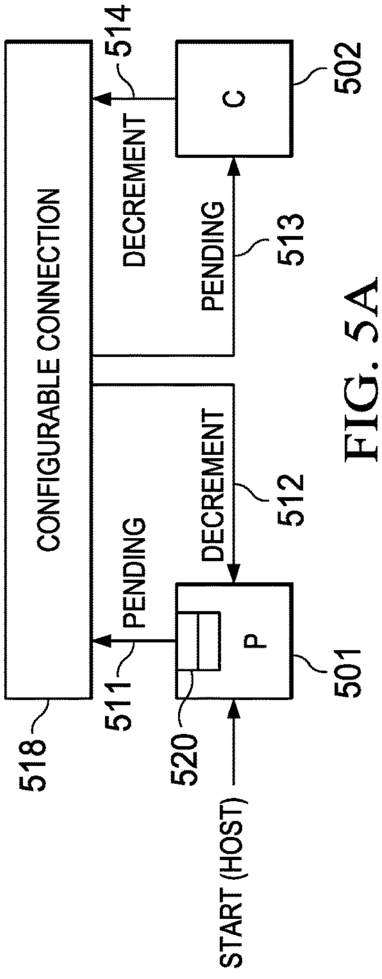
FIG. 5A is a block diagram and FIG. 5B is a timing diagram illustrating operation of a simple example system with two hardware accelerators.
Figure 5B:
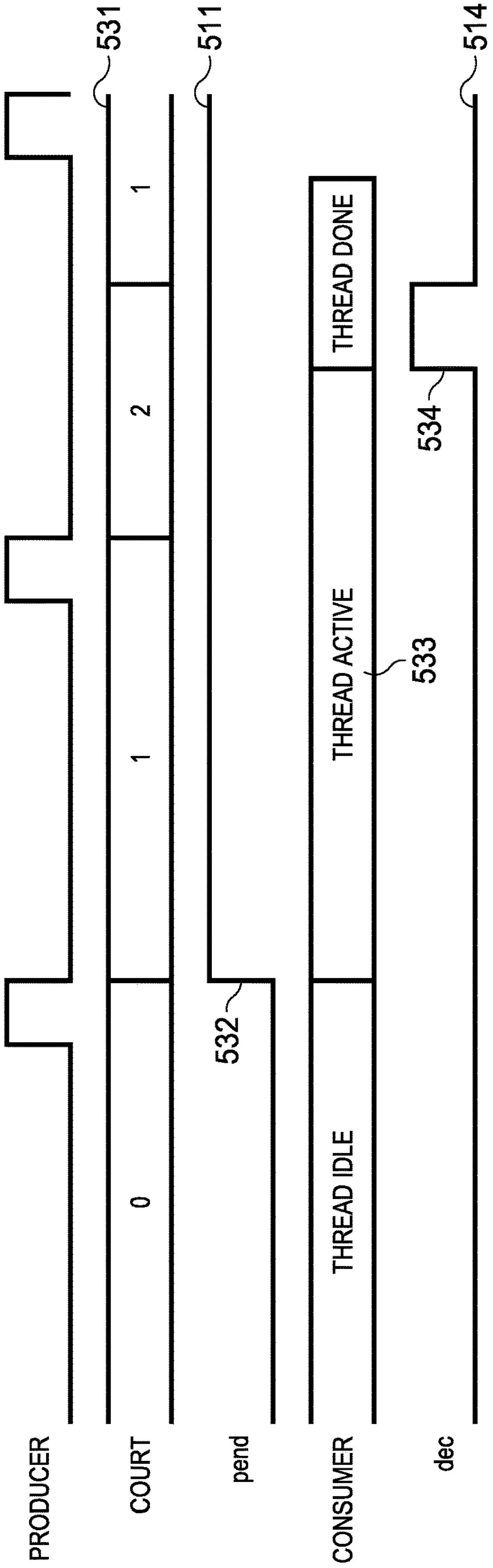

FIG. 5A is a block diagram and FIG. 5B is a timing diagram illustrating operation of a simple example system with schedulers 501, 502 for two associated hardware accelerators, not shown, that include an embodiment of the synchronization scheme disclosed above. In this example, there are two schedulers P 501 and C 502. P is a producer of data and C is the consumer of that data.

A single queue 520 is used for forward event pending messages 511, i.e. P→C. A consumption message is conveyed through a decrement signal 514. P 501 maintains a count 531 of produced data items that it has placed in a buffer. P 501 stalls if this count reaches the buffer depth (max count). P increments the count value when it has produced valid data for C. The pending signal 511 is then asserted 532.

P's 501 producer socket may be connected to C's 502 consumer socket through configurable connection 518, for example. As discussed above in more detail, configurable connection 518 may be a full or partial crossbar switch. In some embodiments, P's 501 producer socket may be connected to C's 502 consumer socket through a fixed connection when configurability is not required, for example.

When pending signal 511 is asserted 532, C 502 starts 533 the processing. C 502 sends an acknowledgment (ack) message by asserting 534 decrement (dec) signal 514. C consumer socket 502 is connected back to P producer socket 501 via connection 518. Once dec 534 is received, P decrements count value 531. The producer can produce further more data asynchronously of consumer rate. In this example the timing diagram illustrates a scenario in which the producer has produced second data to be processed by consumer. This is even before consumer has consumed first data. For this reason, the counter is increased to two. Once the consumer has consumed the first data and sent the dec signal 534, the producer count will be reduced from two to one. As the counter is not zero, the pend signal remains high. This means consumer may process one more data.

Figure 6:
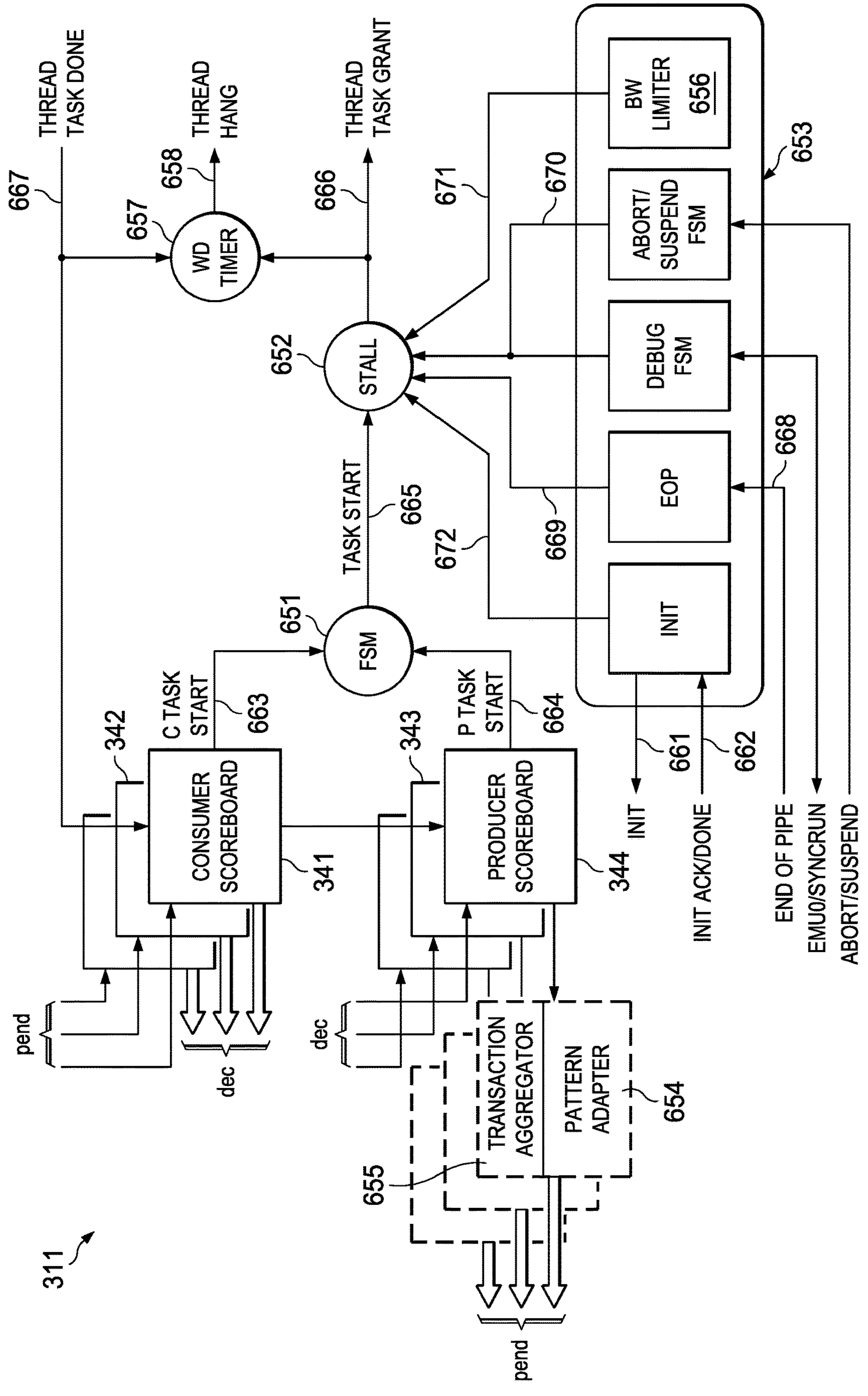
FIG. 6 is a block diagram illustrating one of the hardware based thread schedulers of FIG. 3 in more detail.

FIG. 6 is a block diagram illustrating one of the hardware based thread schedulers of FIGS. 3 and 4 in more detail. The following description will refer to scheduler 311, but this example may represent any of schedulers 311-313, or 411-415 for example. As explained above, each scheduler module 311 may include one or more consumer sockets such as consumer sockets 341-342 and/or one or more producer sockets such as producer sockets 343-344. Task scheduler module 311 may implement a scoreboard or simple state machine for each associated HWA/DMA. In addition, the producer side scheduler may have two variants—one with a max task count for scheduler at head of pipeline and the other without max task count for intermediate producers, as they will be throttled by the consumer side.

In this example node, a producer side task start may be created based on producer side dependencies and a consumer side task start may be created based on consumer side dependencies. The final task start for this node is a logical "and" of both.

A finite state machine (FSM) 651 may be used to control the operation of scheduler 311. When first enabled, scheduler 311 may go through an initialization (init) sequence under control of FSM 651 to allow associated HWA 301 to be initialized. This may involve sending an init signal 661 to HWA 301, as defined in Table 2. Scheduler 311 resets its producer counts and stored events. Once HWA 301 is initialized it may send an init_done (see Table 2) signal 662 to scheduler 311. Scheduler 311 waits for all enabled consumer sockets to receive a pend signal, as indicated by c task start signal 663 and all its enabled producer socket count to be lesser than corresponding depth (max) as indicated by p task start signal 664 to trigger task start request 665. If there is no stall state 652 this task start request 665 triggers task start signal 666. Once HWA 301 completes its task, it sends a task done (tdone) signal 667 (see Table 2) to scheduler 311. The sequence of task start-done continues till scheduler 311 receives an end of pipeline (eop) signal 668 (see Table 2) from HWA 301.

A DMA scheduler at the start of a pipeline may use a max task count value to stop this sequence on its own. Once all schedulers of a pipeline reach an end of pipeline state, this may trigger an end of pipe event for an external host, such as host 332 referring to FIG. 3, and automatically disable all the schedulers associated with the pipeline. To reactivate the pipeline HOST 332 in FIG. 3 needs to reconfigure all associated schedulers and pipeline. Alternatively, a scheduler may be configured with on-the-fly stream input enabled and therefore go back to an init sequence without going through a disable process to minimize host intervention.

Stall state 652 may be used to inhibit sending task grant signal 665 for several conditions that may be indicated by stall logic 653. As mentioned above, scheduler 311 may stall waiting on init complete 672, or after an end of pipe indication 669. A debug operation or an abort command may also assert a stall signal 670.

Various techniques will now be disclosed to assist with the process of scheduling access to various blocks of image data for processing of the image data. For example, a scheme that allows mixing of multiple data patterns across blocks by using pattern adaptors 654 in the scheduler will be described in more detail below. A scheme that allows re-using the same image data while the image data remains in a given data buffer by using a transaction aggregator 655 will be described in more detail below. A scheme that provides bandwidth control for critical and less critical tasks by using programmable delays 656 will be described in more detail below. A scheme that provides failure and hang detection using watch dog timers 657 inside the scheduler will also be described in more detail below.

Figure 7:
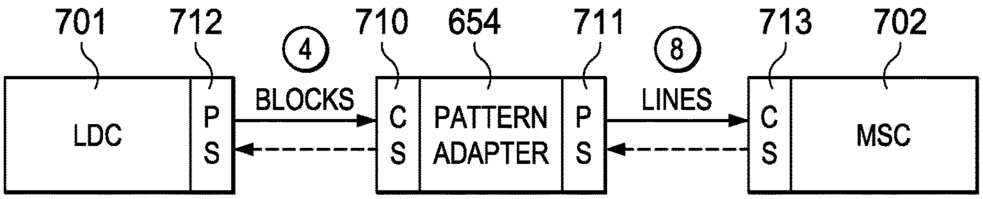
FIGS. 7-9 illustrate an example of pattern adaptation.
Figure 8:
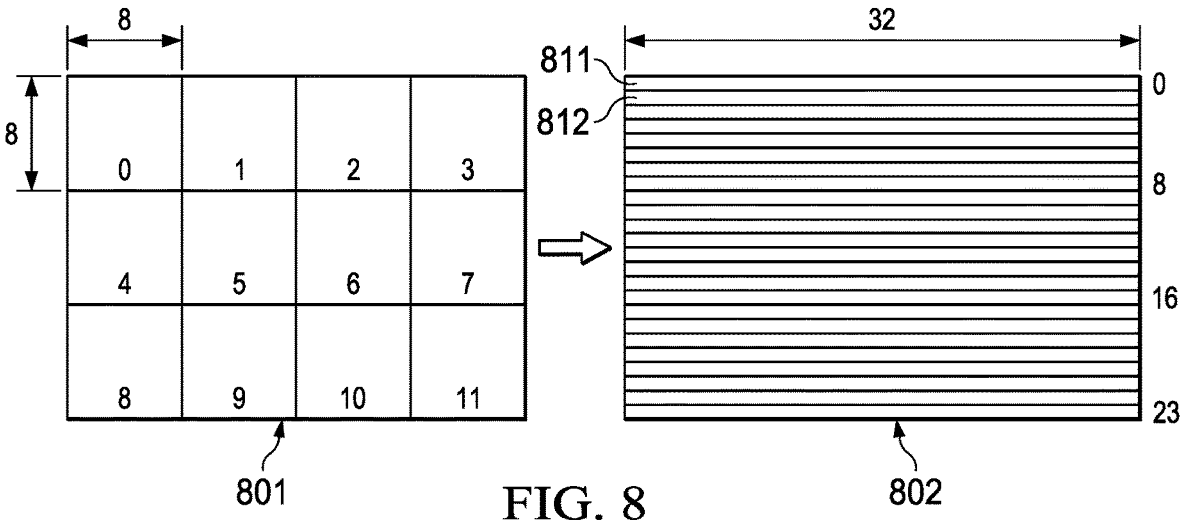

FIGS. 7-8 illustrate an example of pattern adaptation using pattern adapter (PA) module 654, referring back to FIG. 6. A pattern adapter may be used when a production data pattern is different from a consumption data pattern. For example, lens distortion correction (LDC) block 701 may produce two dimensional blocks of data using known or later developed image processing techniques, such as blocks 0-11 in array 801 of FIG. 8. LDC module 701 may be configured to compensate for “fish eye” distortion in an image to produce a non-distorted image, for example. In some applications, a “fish eye” camera lens may be used to capture wide angle view, for example. In another embodiment, LDC block 701 may be configured to process a perspective transform to change a user’s point of view, for example. In another embodiment, LDC module 701 may be configured to process a perspective transform to produce stereo rectification, for example.

Meanwhile, multiscaler (MSC) 702 may operate on lines of data that may span several of the blocks produced by LDC 701 using known or later developed image scaling techniques, such as lines of data 811, 812 in FIG. 8. In FIG. 8 the 2D array 801 of 2D 8×8 blocks of data is the same data as in array 802 of 1D lines of data, just interpreted and processed in a different pattern.

A pattern adapter may also be considered as a module that maps m producer tasks to n consumer tasks. The pattern adapter counts m task starts from CS (consumer socket) 710. After that, pattern adapter’s 654 PS (producer socket) 711 generates n activation messages for the downstream HWA(s) 702, in form of pend assertion. One pend assertion is indicative of one consumable data availability. Pend signal is kept asserted till producer socket receives dec signal from its connected consumer node. De-assertion of pend is completion of one pend assertion. The PS counts n such pend assertions. After that, pattern adapter’s 654 CS generates m acknowledgement messages for upstream HWA 701.

In the context of the example illustrated in FIGS. 7 and 8, in which the 2D blocks of data have an 8×8 data pattern and the 1D lines of data have a 32×1 data pattern, the following steps may be performed by PA 654. Producer socket 712 increments its count on receiving task completion from HWA 701. PS socket 712 then sends a pend signal to consumer socket 710 when each newly processed 2D block of data is available in a shared buffer.

Upon receiving four block task done signals, PA producer socket 711 updates its count with eight for the consumer 702 and asserts pend signals to CS 713 of HWA 702. Pend signal assertion—deassertion is repeated eight times, since eight lines of data are available once four 2D blocks of data are available as illustrated in FIG. 8. HWA 702 now consumes the available lines one after another. CS 713 of HWA 702 sends a dec event one after another as the lines are consumed. In another embodiment, PA producer socket 711 may send a single pend message with accompanying value of “pend count” to CS 713 of HWA 702. In this case, dec message back from CS 713 also needs to carry a “decrement count value”.

On receiving eight line type task done signals from HWA 702, PA 654 decrements it producer count four since four 2D blocks of data have now been consumed. PA 654 then pushes four block type dec messages to producer socket 712 of HWA 701 one after another to complete the handshake. In another embodiment, PA 654 may send a single message with a four count decrement command to producer socket 712 of HWA 701.

In FIG. 7, PS 712 was illustrated in close proximity to HWA 701, while CS 713 is illustrated in close proximity to HWA 702. In some embodiments, the scheduler PS/CS may be implemented within a respective HWA, while in other embodiments they may be implemented in separate locations, as suggested in FIG. 3, for example.

In another example, the arrangement of array 801 and 802 may be reversed. In this example, a producer may produce line oriented data patterns such as array 802 that span multiple 2D data blocks and a consumer may process the data set using a 2D pattern such as array 801. In other embodiments, 1D patterns may span more or fewer 2D patterns. In other embodiments, different types of patterns of data may be produced and consumed with the assistance of a pattern adaptor.

Figure 9:
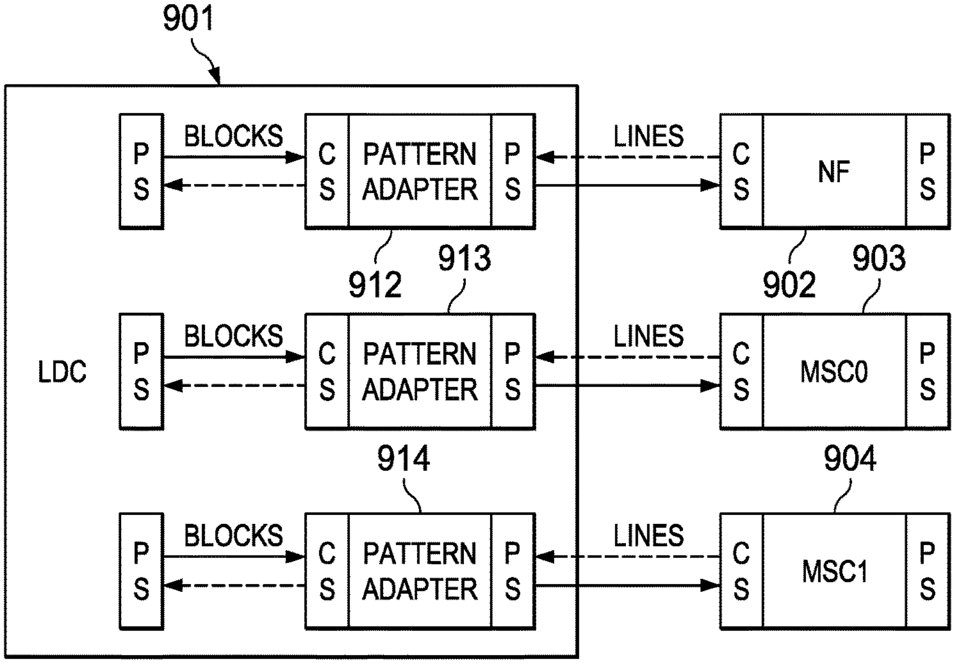

FIG. 9 illustrates a multi-consumer scenario. In this example, a single HWA 901 processes 2D blocks of data. Three pattern adaptors 912-914 are linked with respective HWA 902-904. In this example, HWA 902 may be a noise filter (NF), while HWA 903 is a first multiscaler (MSC0) and HWA 904 is a second multiscaler (MSC1), for example.

In the case of a multi-consumer scenario such as this, each PS in PA 912-914 may count on its own. After that, the CS of each PA 912-914 may generate m acknowledgement messages for upstream HWA 901. Upstream HWA 901 may include an independent PS for each line of pattern adapters.

Figure 10:
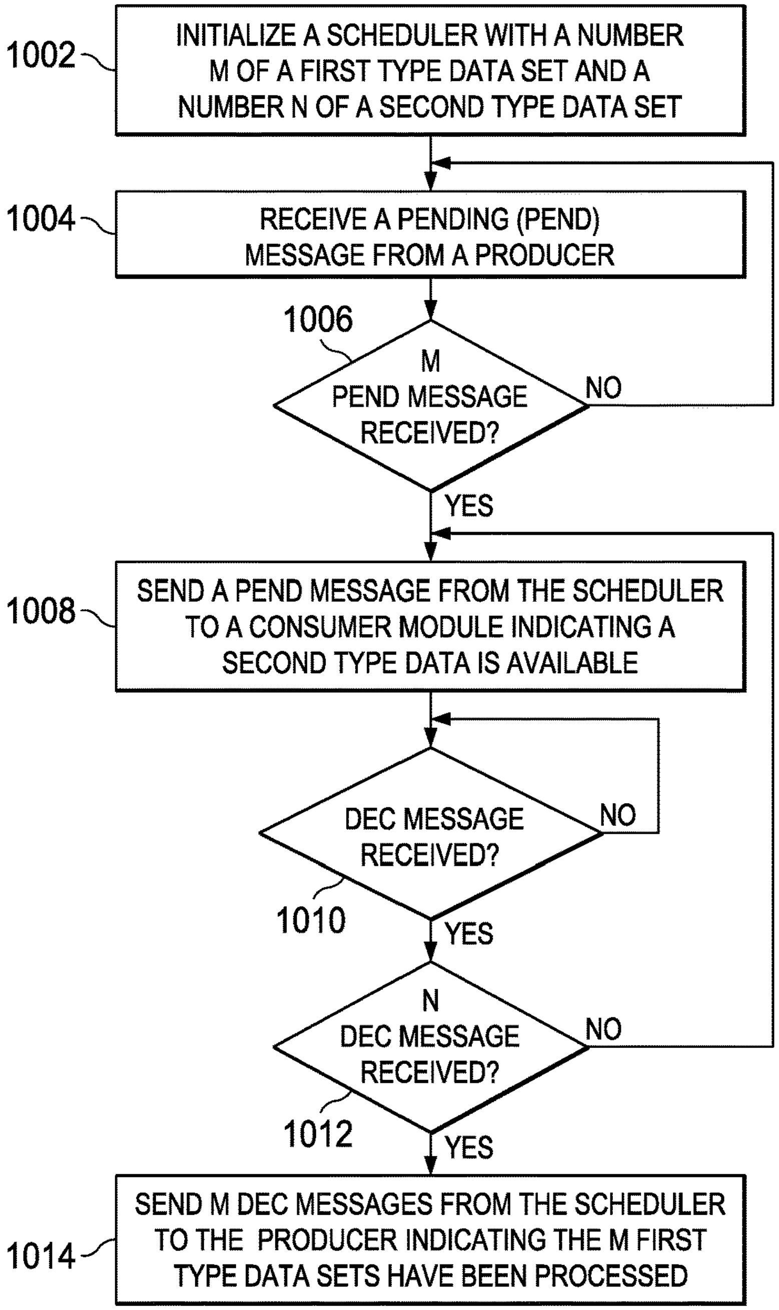
FIG. 10 is a flow chart illustrating aspects of threads scheduling using pattern adaptation.

FIG. 10 is a flow chart illustrating aspects of thread scheduling using a pattern adapter. As described in more detail above, a pattern adapter may be used when a production data pattern is different from a consumption data pattern. For example, a producer may produce two dimensional sets of data, such as blocks 0-11 in array 801 of FIG. 8. Meanwhile, a consumer may operate on lines of data that may span several of the data sets produced by the producer. In FIG. 8 the 2D array 801 of 2D 8×8 blocks of data is the same data as in array 802 of 1D lines of data, just interpreted in a different pattern. Four 2D sets of 8×8 data are required to form eight lines of 32×1 data.

In order to perform pattern adaptation, a pattern adaptor module, such as PA module 654, referring back to FIG. 6, may be initialized 1002 with a number M of a first type data set that is required to provide a number N of a second type data set. For example, M may be four and N may be eight for the example of FIG. 8.

Each time the producer places a first type data set in a buffer memory, it may send a pend message that is received 1004 by the PA module. In this example, the PA module does not send any messages to its consumer module until four pend messages have been received.

Once four pend messages have been received 1006 by the PA module, it may then send 1008 a pend message to its consumer, since in this example eight lines of data are now available in the buffer memory.

The PA module then waits until it receives 1010 a dec message indicating that one of the second type data set have been processed. This sequence of send 1008 a pend message and receive 1010 a dec message may be repeated N=8 times since in this example eight lines of data were available in the buffer memory.

In some embodiments, a single pend message may be sent with a parameter that indicates a value of N, for example. Similarly, in some embodiments, a single dec message may be received with a parameter that indicates N data sets have been processed, for example.

The PA module may then send 1014 four dec messages to its producer indicating that M=4 first type data sets have now been processed. In some embodiments, a single dec message may be sent with a parameter that indicates M data sets have been processed, for example.

As described above, the dec and pend messages may be sent by asserting a respective control signal line in some embodiments.

Figure 11:
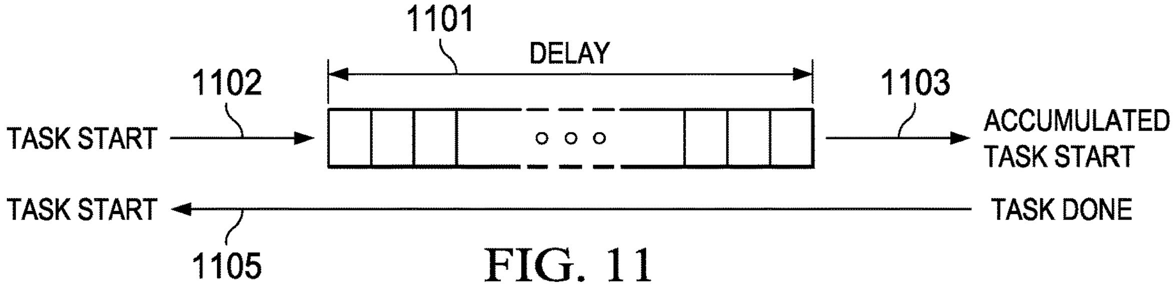
FIG. 11 is a timing diagram illustrating an example of transaction aggregation.

FIG. 11 is a timing diagram illustrating an example of transaction aggregation using transaction aggregator (TA) 655, referring back to FIG. 6. A transaction aggregator may be implemented within scheduler 311 as illustrated in FIG. 3, or it may be implemented in combination with a specific HWA, for example. Each TA may be embodied with a producer socket and/or with a consumer socket and configurable control logic to perform the aggregation operation.

Transaction Aggregator (TA) 655 may aggregate the task start and done when the same data is shared across several threads of execution. For example, in a growing window, frame lines may be read from external memory 321 (referring back to FIG. 3) and each line is valid for a VSR (vertical search range) number of thread operations. Similarly, in a noise filter and scalar which have t taps of filter, every line is valid for t number of thread operations except at the beginning and the end of frame. For this purpose, the task starts 1102 from the DMA (producer) scheduler may be aggregated for the required number of cycles before issuing a task start 1103 for another frame line, for example.

The aggregator is conceptually a delay line 1101, where the delay is programmed to the number of transactions that need to be accumulated. In the case of a five tap (vertical) filter, there may be a need to accumulate five lines from the DMA or the producer to kick start the filter operation. In the case of a +/−64 growing window, there may be a need to accumulate 128 lines from the DMA to kick start the optical flow processing. This may be achieved by the producer socket of the scheduler generating a pend signal only after the producer count reaches a configured count threshold value, for example. Upon task completion 1105, the data corresponding to the transaction may be removed in order of their arrival.

In another configuration, a TA module may be coupled to several consumers that each may want to process a same set of data. In this case, the TA module may delay sending a pend message to a task that will remove the set of data until the TA module receives a dec message from each of the consumer modules that are configured to use the set of data. For example, two scaler modules may each want to process the data set. Each scaler module may use a pattern adapter function to process the data using a different pattern than the producer that created the data. In this case, the TA module would delay sending a dec messages to the producer of the data until both scaler modules had sent multiple dec messages indicating they had finished processing the data set.

Figure 12:
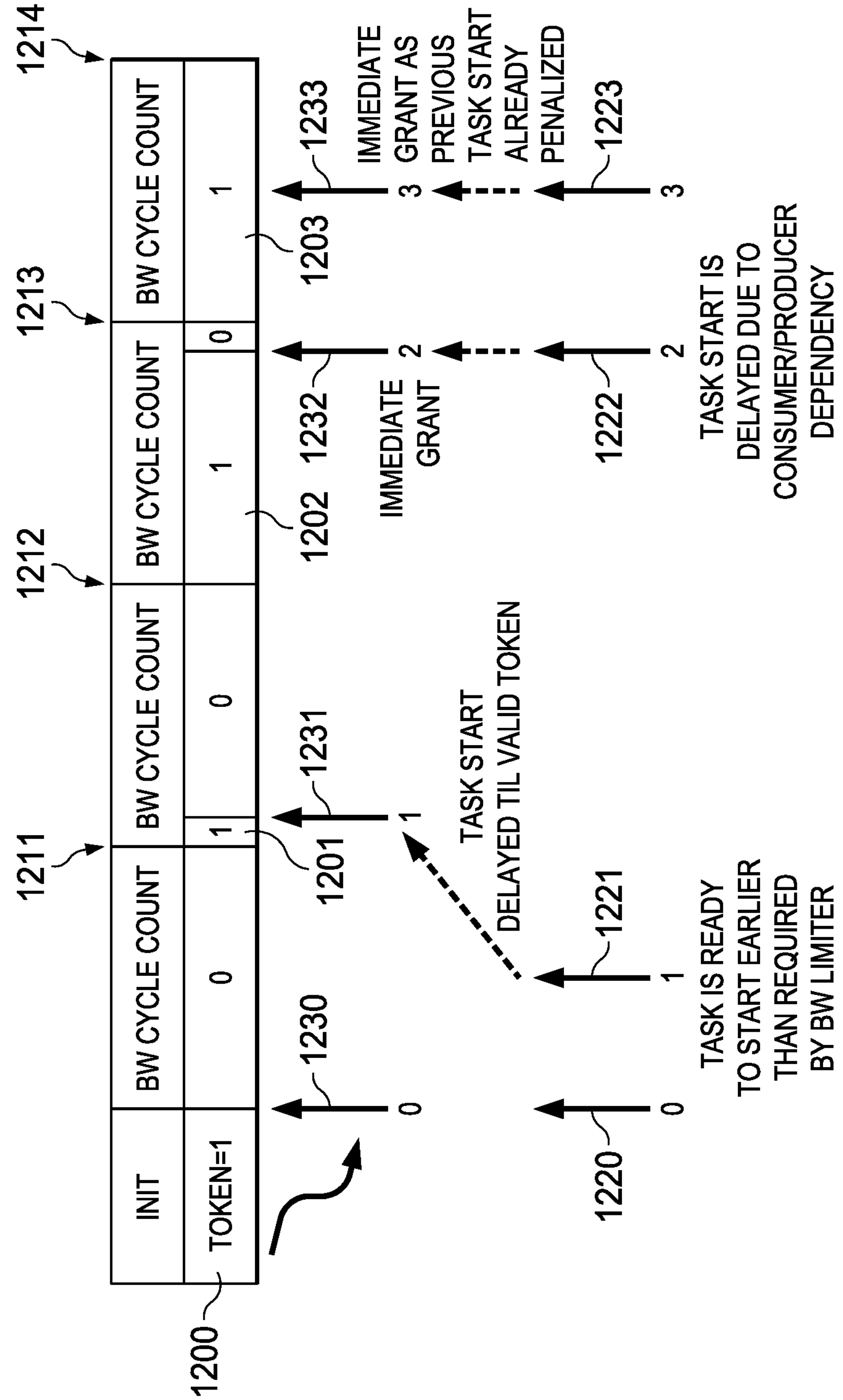
FIG. 12 is a timing diagram illustrating an example of bandwidth flow control.

FIG. 12 is a timing diagram illustrating an example of bandwidth flow control using bandwidth control logic 656, referring back to FIG. 6. Referring back to FIG. 3, it can be seen that multiple HWAs 301-303 may access L2 shared memory 320 and L3 external memory 321. A first one, say for example HWA 301, may be configured to perform processing on a large set of data that is located in L2 320 and/or L3 321 by iterative repetition of one or more processing tasks and may be able to process the entire set of data in a short time, even though the results of the processing may not be needed for some time. Simultaneously, a second one, say for example HWA 302, may be configured to perform processing on a set of data that is also located in L2 320 and/or L3 321 in which the results of the process may be needed quickly. However, due to the processing activity of HWA 301, HWA may be blocked from completely its processing task in a timely manner.

In this case, bandwidth limiting logic 656 in thread scheduler 311 of HWA 301 may be configured to regulate and evenly distribute processing of HWA 301, for example, by using stall state 652. One way to do this may be to use the concept of a token 1200. A token may be created at a periodic rate, referred to herein as a "token period." In this example, a new token may be created in a periodic manner as illustrated at 1200-1203 based on a count of clock cycles or other timing mechanism, as illustrated at 1211-1214. Each initiation of a task may be made conditional on the availability of a token. Once a task is started, one token is destroyed. In this manner, each task initiation may be regulated to occur at an average rate determined by the token period, which may be configured using one of the memory mapped registers 322, referring back to FIG. 3, for example.

As discussed above, several producer and/or consumer dependency conditions may need to be completed before a task is allowed to start, which may be managed by the HTS logic as described above. Therefore, sometimes a token may be available but the task may not ready for due to another condition. Sometimes due to long dependency delays that span multiple token periods, multiple tokens may be created. In this case, a maximum number of tokens may be specified in order to prevent a large burst of task activity after the dependency delays are resolved. The maximum token count may be configured using the memory mapped registers 322, for example.

For example, referring still to FIG. 12, at time 1220 task 0 may be ready to start. Token 1200 is initially created and task 0 is allowed to start at time 1230. Task 1 may be ready to start at time 1221; however, token 1201 is not created until time 1211 at the completion of a cycle count, as described above. Therefore, task 1 is stalled until time 1231 when token 1201 becomes available. Token 1202 may become available at time 1212 at the completion of the cycle count, but task 2 may not be ready to start until later due to consumer and/or producer dependencies, as described above. In this example, the consumer/producer dependencies may be completed at time 1222 and therefore task 2 may be allowed to start at time 1232. Task 3 may be ready to start at time 1223 which is less than one token period since task 2 started. However, since task 2 was delayed and token 1203 was created at time 1213, task 3 may be given an immediate grant to start execution at time 1233. While several timing scenarios are illustrated in this time diagram, this is not intended to be a limiting example.

Referring again to FIGS. 3 and 6, watchdog timer logic 657 may be provided in the thread scheduler 311 or each HWA 301-303. Each watchdog timer 657 may begin counting a number of clock cycles after a task start signal 666 is asserted to start a new task execution on an associated HWA. If a task done signal 667 is not received from the associated HWA before a specified number of clock cycles after a task start, then the watchdog timer may initiate an interrupt to a higher level control function by asserting a "thread hang" signal 658, for example. The higher level control function may be implemented on host processor 332, for example.

As described above, a thread of execution may be decomposed into a set of fine grain tasks that each may operate on a small set of data, such a 32×1 line or an 8×8 block of data, for example. A maximum time may be determined that is required to execute each task. The maximum time may include some additional padding to account for scheduling and data dependencies, for example.

The timeout period may be determined by a default value in some embodiments. In other embodiments the timeout period may be configured using the memory mapped registers 322, for example. In this example, HTS 310 along with HWA 301-303 are operated based on a 300 MHz clock rate. Each watchdog timer 657 is configured with a default value of 64 k cycles, which is equivalent to approximately 0.2 ms. Therefore, in this example, a timeout error may be alerted when any fine grain task from any HWA is not completed within approximately 0.2 ms. This fast detection of a hang condition may alert security critical functions and potentially take corrective action faster.

Figure 13:
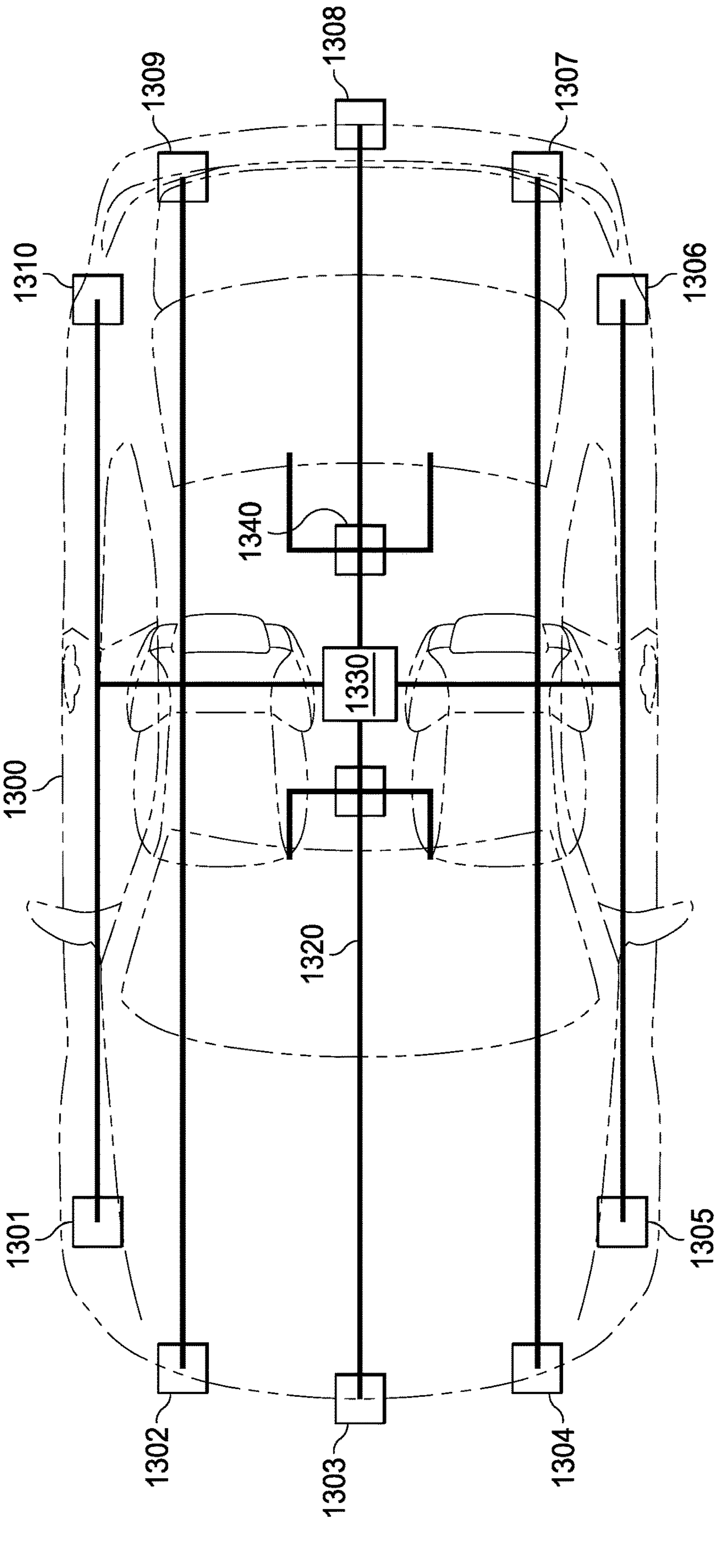
FIG. 13 is an illustration of an automobile that is equipped with multiple camera and radar sensor devices and includes an example system with a hardware accelerator thread scheduler.

FIG. 13 is an illustration of an automobile 1300 that is equipped with multiple camera and radar sensor devices 1301-1310 and includes an example processing system 1330 with a hardware accelerator thread scheduler as described in more detail above. In this example, multiple image capture devices such as camera and radar sensors 1301-1310 are located in the front and rear areas of automobile 1300 and connected to processing system 1330 via an automotive internet 1320. Image processing system 1330 may be coupled to control systems within vehicle 1300, such as control system 1340. Control system 1340 may be coupled to the engine, steering, and/or braking systems, for example. Control system 1340 may use image data processed by image processing system 1330 to perform various types of ADAS functions.

The evolution of ADAS technology involves several areas of innovation. Two important related trends include shrinking individual components such as sensors, cameras and electronics, and integrating dedicated functions into more comprehensive systems. These trends are complementary because smaller, less expensive components are needed to build larger systems affordably. For example, the same front cameras 1301-1305 that serve for lane-keep assistance can also provide information to detect objects in front of the car, read traffic signs or apply the brakes to avoid a crash. However, performing more complex ADAS functions requires not only input from more cameras and from other sensors such as ultrasound, LIDAR and radar, but also the fusion of data from those different sensor elements. Fusion also enables overcoming the drawbacks of individual sensor solutions and can provide some level of redundancy.

Processing system 1330 may be based on SoC devices such as those available from Texas Instruments Incorporated (TI), such as the TDA3x and TDA3x family of devices that may be augmented to include embodiments of the techniques disclosed herein. TI has fully integrated a set of peripherals into the TDAxx solution to simplify design and minimize space, thus facilitating sensor fusion as illustrated in FIG. 13. Communication interfaces, especially for camera-based systems like surround view and back-up camera, may benefit from TI's latest generation FPD-Link III SerDes family, which helps reduce the effort to connect remote ADAS satellites to central processing modules using a single coaxial cable. Reduced wiring effort and smaller modules due to smaller connectors and highly integrated components help ensure that the ever growing number of sensor modules for ADAS is not burdening new cars with high extra cost and weight. See, for example, "Paving the way to self-driving cars with advanced driver assistance systems," Hannes Estl, August, 2015.

While an automobile 1300 is illustrated herein, other embodiments may be placed in other types of vehicles, such as trucks, trains, planes, drones, etc. and used to assist or fully control operation of the vehicle.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

While embodiments have been described herein in reference to ADAS, one of ordinary skill in the art will understand embodiments for computer vision applications other than ADAS may benefit from embodiments of the present disclosure, such as, for example, automotive, industrial applications, high performance computing, robotics, drones, etc.

While embodiment have been described herein that may target image processing, other embodiments may target other types of data processing in which multiple processors executing multiple processing threads may be used.

While hardware embodiments of a set of thread schedulers has been illustrated herein, in some embodiments thread schedulers that implement the principles disclosed herein may be implemented in software that is executed on one or more processing cores, for example.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A system comprising:

data processors configured to process a set of image data in parallel;

thread schedulers coupled to the data processors, each of the thread schedulers associated with a respective set of consumer sockets and configured to provide a respective task start signal for a respective data processor of the data processors in response to receiving a set of pending signals at the respective set of consumer sockets; and a bandwidth controller coupled to at least one of the data processors, the bandwidth controller configured to, for each of the at least one of the data processors:

maintain a respective token count, in which tokens of the token count are created at a periodic rate based on a count of clock cycles; and stall the respective task start signal when the respective token count is zero, and propagate the respective task start signal to the data processor and decrement the respective token count when the respective token count is greater than zero.

2. The system of claim 1, wherein:

each of the consumer sockets is configured to receive a pending signal from a producer node indicating availability of data to be processed by the respective data processor; and each of the thread schedulers is configured to provide the respective task start signal only after each enabled consumer socket of the respective set of consumer sockets has received the respective pending signal.

3. The system of claim 1, further comprising a memory-mapped register configured to store a programmable count of clock cycles.

4. The system of claim 1, wherein the bandwidth controller is configured to limit each token count to a maximum value.

5. The system of claim 1, wherein the bandwidth controller includes multiple instances of bandwidth control logic, each instance of bandwidth control logic included in a respective one of the thread schedulers and operably coupled to the respective data processor.

6. The system of claim 5, further comprising:

timers respectively coupled to the thread schedulers, wherein each of the timers is configured to begin timing in response to a respective task start signal of the task start signals being propagated by the respective bandwidth control logic.

7. The system of claim 6, wherein each of the watchdog timers is configured to monitor for failure to complete a task by a respective data processor of the data processors within a set time period.

8. The system of claim 1, wherein at least one of the thread schedulers includes a pattern adaptor.

9. The system of claim 1, further comprising a memory resource coupled to the data processors, wherein each of the data processor is configured to access the memory resource as a buffer for processing the set of image data.

10. The system of claim 1, further comprising an image capture device configured to provide the set of image data.

11. The system of claim 1, wherein the system is configured to be mounted to a vehicle.

12. The system of claim 1, wherein the data processors are configured to perform an operation on the set of image data, the operation being at least one of image scaling, lens distortion correction, noise filtering, vision preprocessing, motion detection, and edge detection.

13. The system of claim 10, wherein the bandwidth controller is configured to regulate bandwidth usage of a first data processor of the data processors to prevent the first data processor from blocking timely completion of image processing tasks by a second data processor of the data processors sharing a memory resource with the first data processor.

14. A system comprising:

data processors configured to process a set of image data in parallel; and thread schedulers respectively coupled to the data processors, each of the thread schedulers configured to provide a respective task start signal for a respective data processor of the data processors in response to receiving a pending signal at a consumer socket of the respective thread scheduler, each of the thread schedulers having bandwidth control logic to maintain a token count for the respective data processor, in which tokens of the respective token count are generated at a rate determined by a count of clock cycles; stall assertion of the respective task start signal to the respective data processor when the respective token count is zero; and propagate the respective task start signal to the respective data processor when respective token count is greater than zero.

15. The system of claim 14, further comprising a memory-mapped register configured to store a programmable count of clock cycles.

16. The system of claim 14, wherein each of the thread schedulers includes a timer that is configured to begin timing in response to a respective task start signal of the task start signals being propagated by the respective bandwidth control logic.

17. The system of claim 14, further comprising an image capture device configured to provide the set of image data.

18. The system of claim 17, wherein the bandwidth controller is configured to regulate bandwidth usage of a first data processor of the data processors to prevent the first data processor from blocking timely completion of image processing tasks by a second data processor of the data processors sharing a memory resource with the first data processor.

* * * * *